Aug. 10, 1965

J. P. WADLECK ETAL 3,199,326

ROLL CHANGING DEVICE FOR ROLLING MILLS

Filed July 20, 1962

INVENTORS.
JOSEPH P. WADLECK
CHARLES MACGREGOR
BY ROBERT A. REMNER
Bosworth, Sessions
Henston & Knowles
ATTORNEYS.

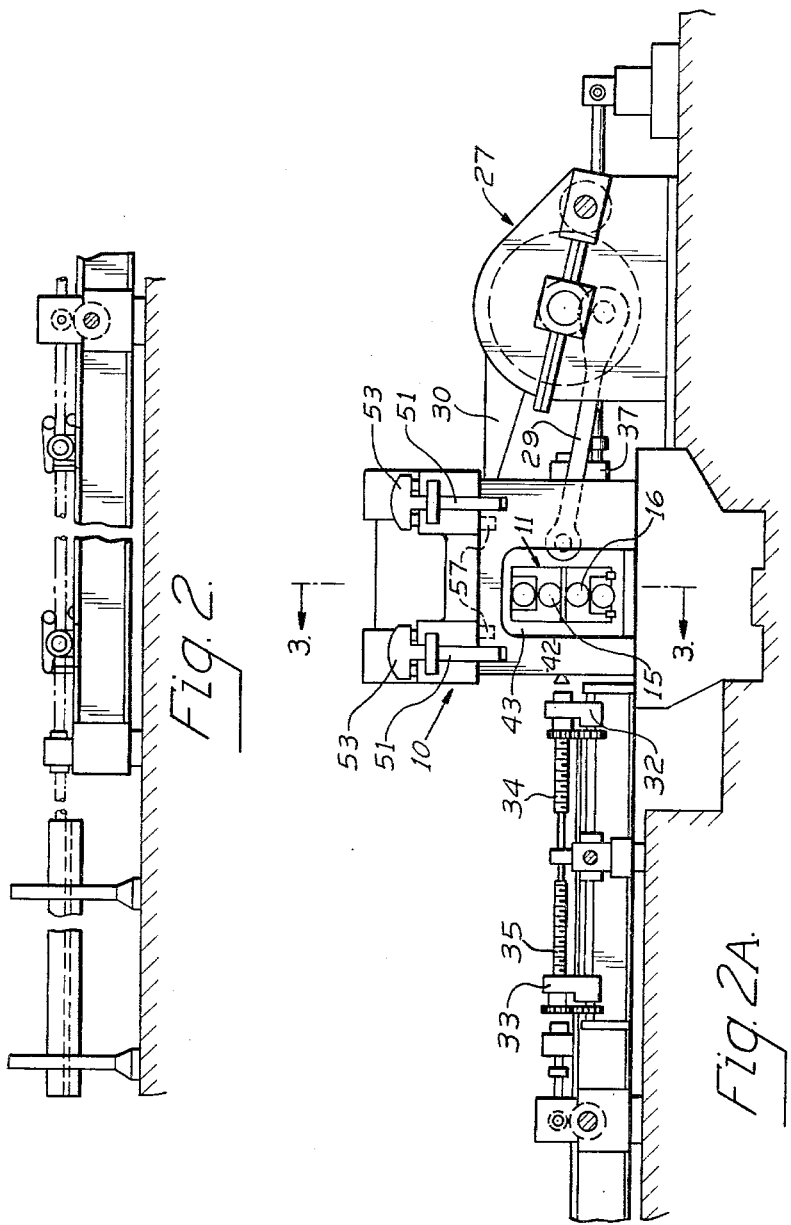

INVENTORS.
JOSEPH P. WADLECK
CHARLES MacGREGOR
ROBERT A. REMNER
BY Bosworth, Sessions, Herreton & Knowles
ATTORNEYS Aug. 10, 1965     J. P. WADLECK ETAL     3,199,326
ROLL CHANGING DEVICE FOR ROLLING MILLS
Filed July 20, 1962     10 Sheets-Sheet 6

INVENTORS.
JOSEPH P. WADLECK
BY CHARLES MAC GREGOR
ROBERT A. REMNER
Bosworth, Sessions, Herstrom & Knowles
ATTORNEYS.

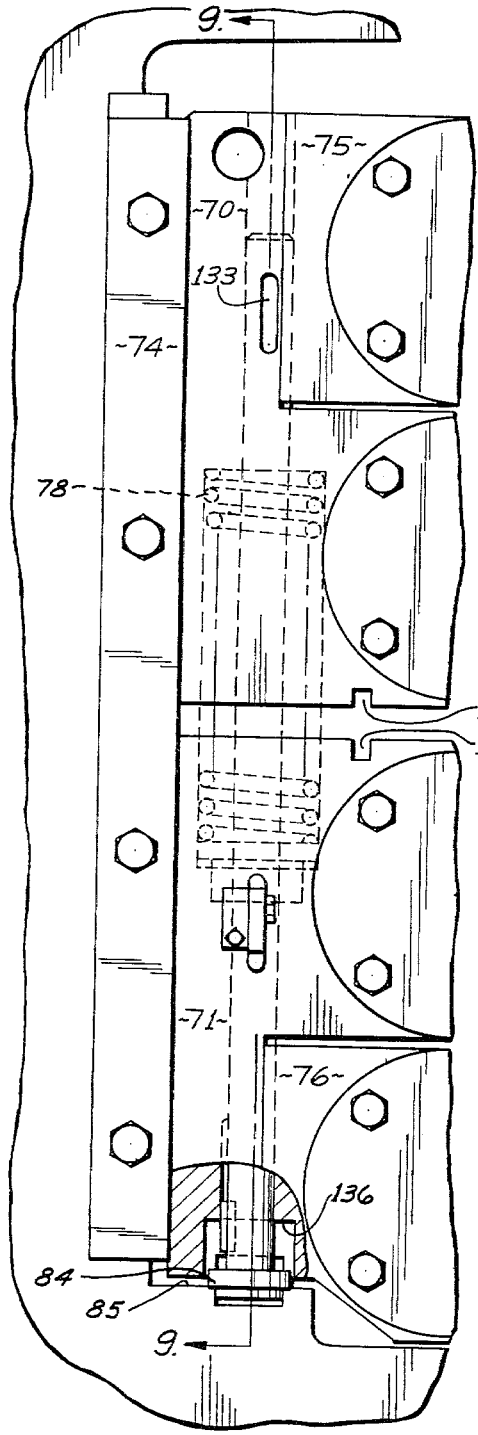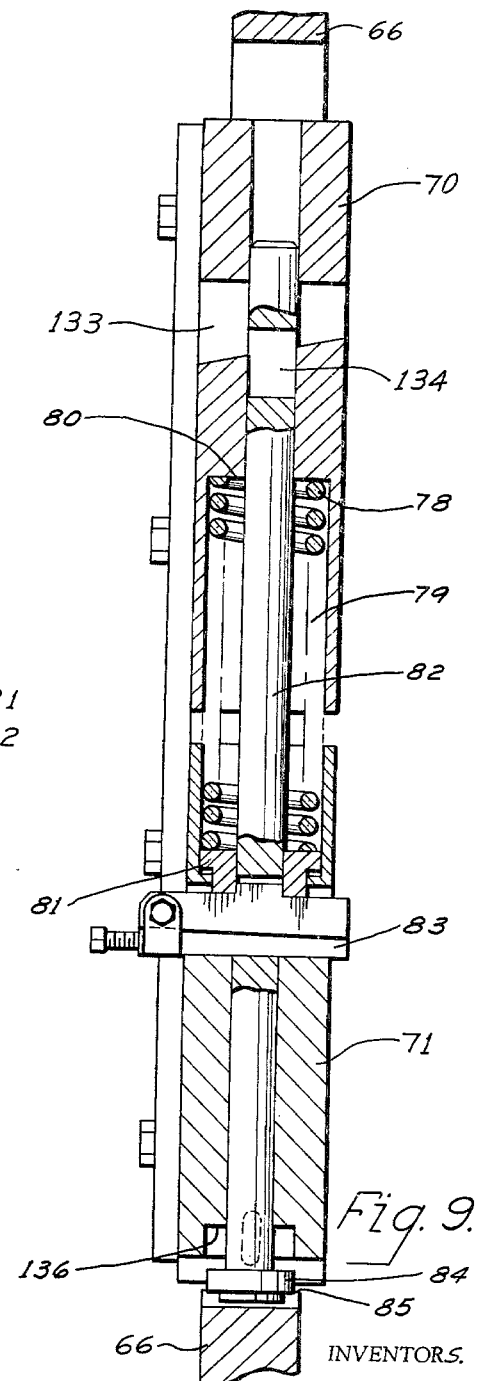

INVENTORS.
JOSEPH P. WADLECK
CHARLES MACGREGOR
ROBERT A. REMNER
BY Bosworth, Sessions, Herrstrom & Knarlu
ATTORNEYS.

Aug. 10, 1965  J. P. WADLECK ETAL  3,199,326
ROLL CHANGING DEVICE FOR ROLLING MILLS
Filed July 20, 1962  10 Sheets-Sheet 9

INVENTORS.
JOSEPH P. WADLECK, CHARLES MACGREGOR,
ROBERT A. REMNER.
BY
Bosworth, Sessions,
Herrström & Knabe
ATTORNEYS.

United States Patent Office 3,199,326
Patented Aug. 10, 1965

3,199,326
ROLL CHANGING DEVICE FOR ROLLING MILLS
Joseph P. Wadleck, Ellwood City, Robert A. Remner, Glenshaw, and Charles MacGregor, Pittsburgh, Pa., assignors to Blaw-Knox Company, Pittsburgh, Pa., a corporation of Delaware
Filed July 20, 1962, Ser. No. 211,233
8 Claims. (Cl. 72—198)

This invention relates to machines for rolling elongated workpieces such as tubes, rods, bars and the like, in which the rolls that do the work are reciprocated and the workpieces are intermittently advanced into the bite of the rolls. More particularly, the invention relates to roll changing devices for such mills.

Machines of this general type adapted to roll tubular workpieces between grooved die rolls in order to elongate the workpieces and reduce their wall thickness and diameter are well known. They comprise a roll supporting saddle which is reciprocated in a horizontal plane by a drive mechanism. The saddle carries die rolls having opposed grooves adapted to do work on one or more tube blanks or other workpieces interposed between the rolls. As the saddle reciprocates the rolls are rotated by engagement between the gears mounted on the rolls and racks mounted on the frame on which the saddle reciprocates. In tube rolling machines, one or more mandrels are provided; these extend into the space within the grooves of the rolls and function to support the workpiece during the rolling operation and to control the internal diameter of the tubes. Means are provided to advance and retract the mandrel so that tube blanks may be placed on the mandrel.

In machines of this type it is necessary to change the die rolls in order to adapt the machine to work on workpieces of different diameters or shapes or to produce work having different diameters or shapes. It is also necessary to remove the die rolls periodically to provide for dressing or otherwise repairing or reconditioning the rolls. In the past, changing the die rolls has been a time consuming operation that is expensive, not only because of the amount of labor involved but also because of the loss of production that results from the down time of the machine.

A general object of the present invention, therefore, is to provide a rolling machine or mill of the type embodying a reciprocating saddle or carriage carrying the working rolls of the mill in which provision is made whereby the mill rolls can be removed and replaced with much less labor and loss of time than is required with mills of prior types. The invention is described herein as applied to a tube rolling machine of the type disclosed and claimed in the Krause Patent No. 3,030,835, issued April 24, 1962 and a more specific object of the invention is the provision of a roll changing mechanism for rolling mills of the general type shown in the Krause patent. It is to be understood, however, that the invention may be applied to mills of other types, including mills for rolling solid workpieces, such as rods and bars, as well as other types of mills for rolling tubes.

Further objects and advantages of the invention will become apparent from the following description of a preferred form thereof, reference being made to the accompanying drawings. The essential characteristics of the invention are summarized in the claims.

Referring to the drawings:

FIGURES 1 and 1a constitute together a somewhat diagrammatic plan view of a tube rolling machine made according to the aforesaid Krause patent and embodying the present improvement.

FIGURES 2 and 2a together constitute a side elevation of the machine shown in FIGURES 1 and 1a.

FIGURE 8 is a view similar to FIGURE 6 but showing the mill rolls in working position.

FIGURE 9 is a section taken on line 9—9 of FIGURE 8.

Figure 11:
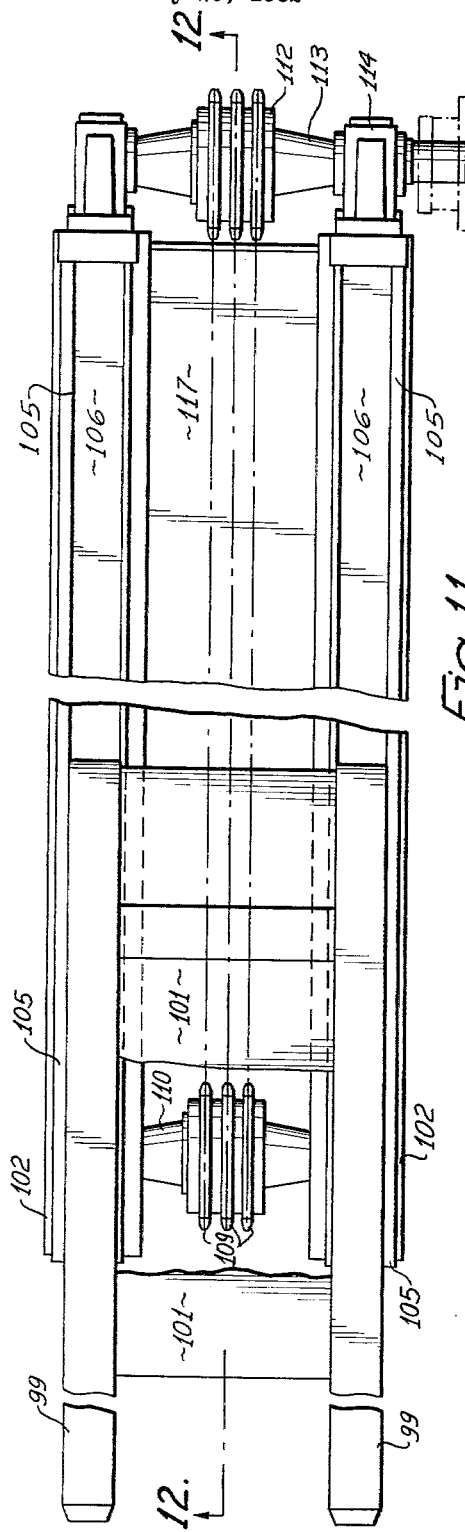
FIGURE 11 is a plan view of the roll changing cariage.
Figure 12:
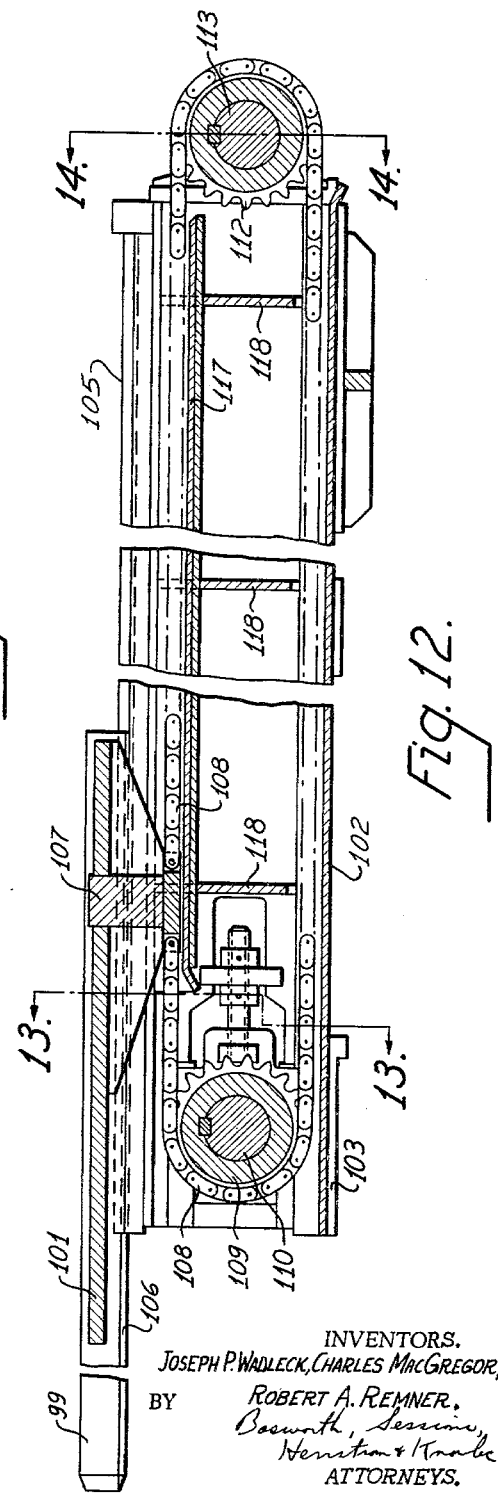
Figure 13:
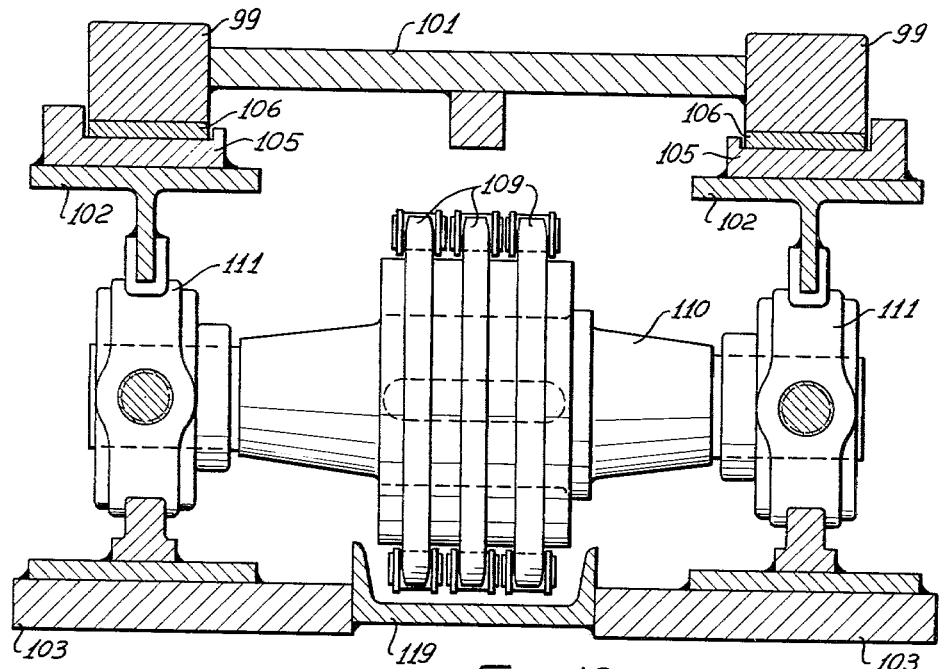
Figure 14:
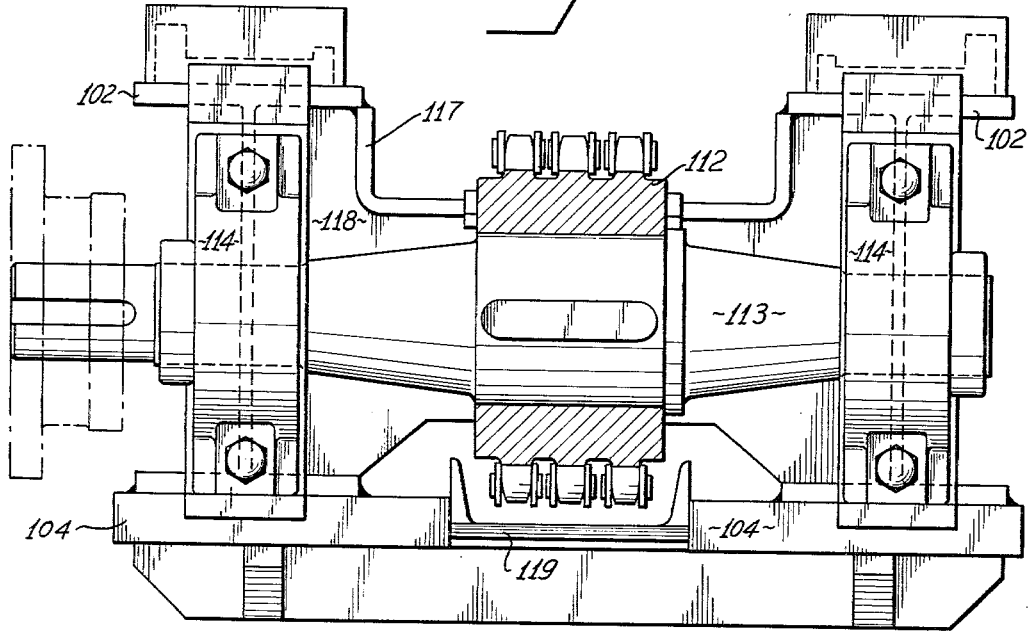

FIGURE 12 is a vertical section illustrating the roll changing carriage, the section being taken on the line 12—12 of FIGURE 11; and FIGURES 13 and 14 are transverse sections through the roll changing carriage taken as indicated by lines 13—13 and 14—14 of FIGURE 12, respectively.

Figures 1, 1A:
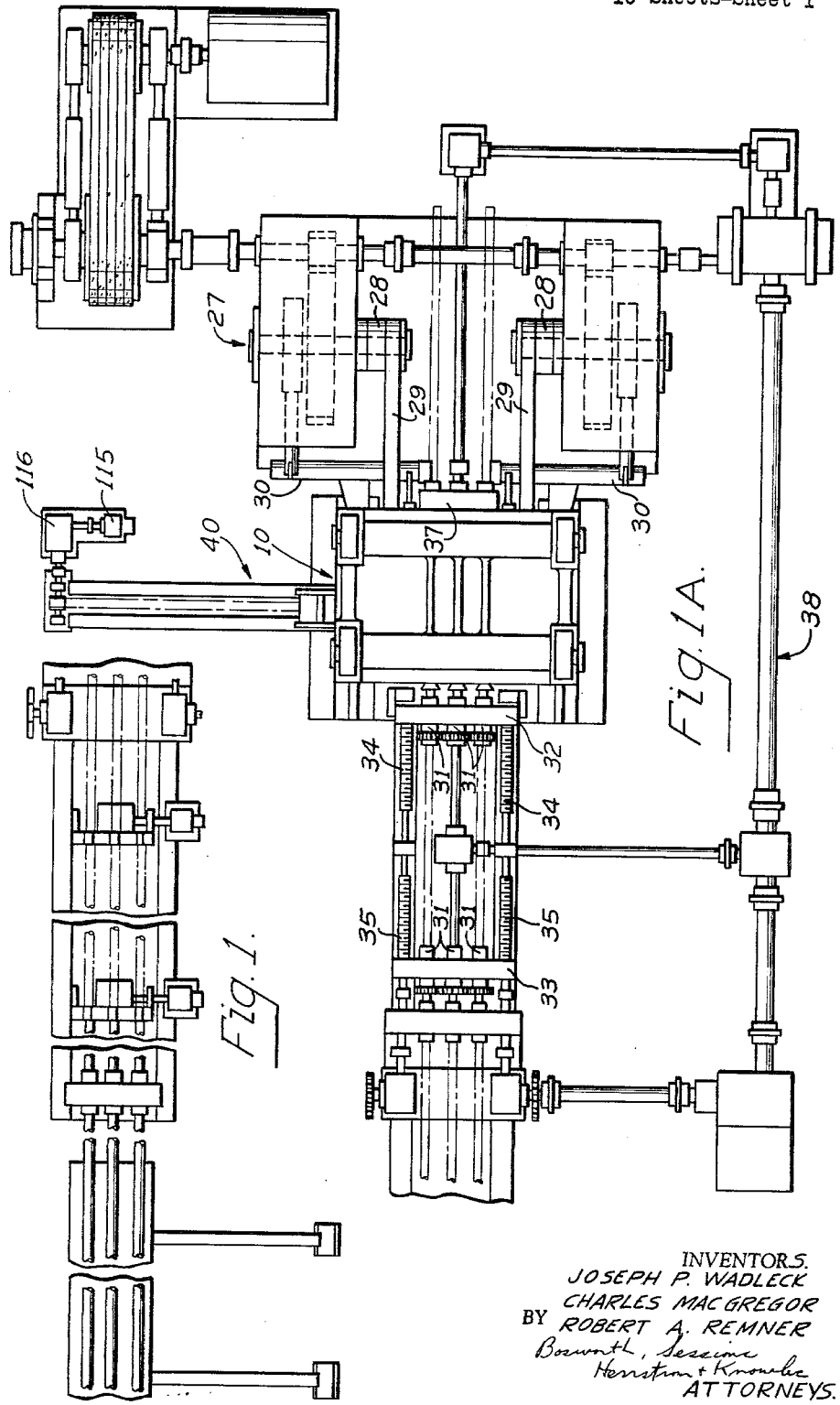
Figure 3:
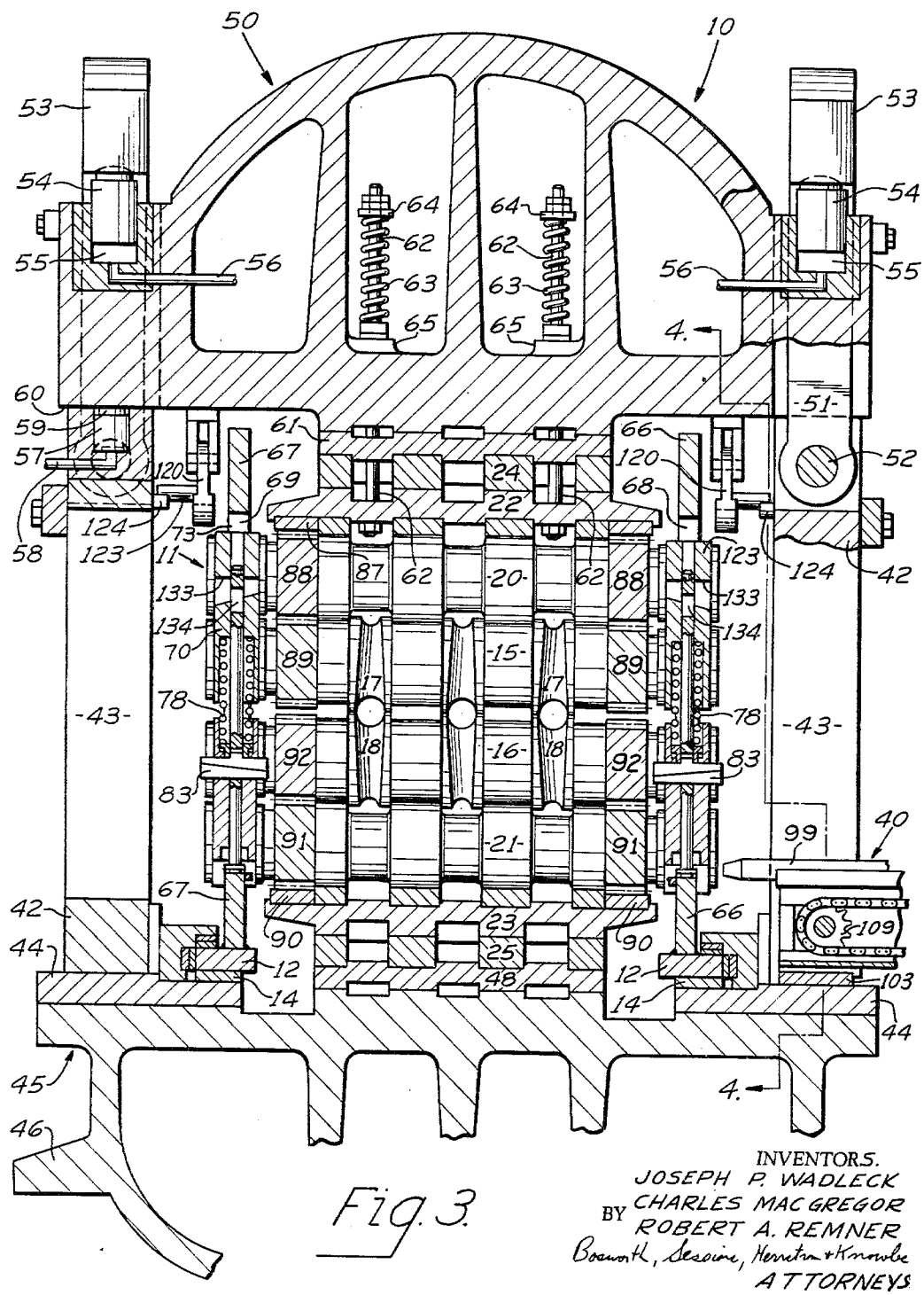
FIGURE 3 is a transverse sectional vertical view on an enlarged scale through the saddle and mill rolls, the view being taken substantially as indicated by line 3—3 on FIGURE 2a and showing the rolls in operating position.

*General arrangement.*—As noted above and as shown in FIGURES 1, 1a, 2 and 2a, the general arrangement of a prefered form of the machine is similar to that of the machine shown in the aforesaid Krause patent. The machine comprises a mill housing indicated in general at 10 within which a saddle 11 is supported for reciprocation upon slides 12 that operate on tracks 14. See FIGURE 3. The saddle 11 carries working or die rolls 15 and 16 which are provided with a plurality of die recesses or grooves 17 and 18, respectively, so that the rolls can work simultaneously on a plurality of workpieces. The working rolls are supported by back-up rolls 20 and 21 which are supported by thrust plates 22 and 23, respectively. The thrust plates in turn are supported by movable wedges 24 and 25; when the wedges are in working, or inner, position, the working or die rolls 15 and 16 are held together in working position as shown in FIGURE 3. When the wedges are withdrawn the rolls 15 and 16 move apart and are disengaged from the workpieces.

The saddle is reciprocated on its tracks by means of a main drive mechanism indicated in general at 27 and disposed at the exit or discharge end of the machine. The mechanism includes cranks 28 which are disposed on either side of the pass line of the machine and are connected to the saddle by connecting rods 29. The cranks are rotated at speeds of the order of 80 to 100 or more revolutions per minute, although this may be varied throughout a considerable range. Reciprocation of the saddle by the connecting rods causes the working or die rolls 15 and 16 and the backup rolls 20 and 21 to rotate. Positive rotation of these rolls is insured by the provision of racks and pinions as described below. The tubes or other workpieces are fed into the working zone of the machine from the left in the arrangement shown in the drawings and are discharged to the right.

The working stroke of the die rolls 15 and 16 takes place as the saddle is moved from left to right. When the workpieces are tubular, they are supported during the rolling operation by mandrels having tapered points, as described in the aforesaid Krause patent.

The wedges 24 and 25 are withdrawn at the end of each working stroke of the saddle 11 and replaced at the end of each return stroke by means of the wedge operating mechanism indicated in general at 30 so that no work is done upon the tubes during the return stroke of the saddle and the rolls. During the return stroke the tubes are advanced and are rotated a fraction of a revolution by chucks 31 carried by cross heads 32 and 33 disposed on the entry side of the machine. These cross heads are moved in opposite directions along the frame of the machine by feed screws 34 and 35 so that the cross heads alternately approach and withdraw from each other. As explained in the aforesaid Krause patent, the chucks in the cross heads are alternately caused to grip the work and to release the work so that the tubes are advanced through the machine. A cross head 37 is also provided at the exit end of the machine to insure rotation of the tubes after the blanks have been released by both cross head 32 and cross head 33. The cross heads are moved toward and away from each other and the chucks are rotated by the chuck rotating and advancing mechanism indicated in general at 38. These mechanisms and the mechanisms whereby the mandrels are supported so that they can be loaded without stopping the machine are all illustrated and described in detail in the aforesaid Krause patent; inasmuch as these mechanisms form no part of the present invention they are not described in detail herein.

The mechanism 30 for withdrawing and replacing the wedges and the chuck rotating and advancing mechanism 38 are both driven from the main drive and therefore all of the operations of the machines are mechanically synchronized.

*Mill housing.*—The workpieces are rolled to the desired diameter and, in the case of tubular blanks, to the desired wall thickness by the die rolls 15 and 16 which are supported in the reciprocating saddle 11 that is in turn mounted in the mill housing 10. These parts are shown particularly in FIGURES 3, 4 and 5. The present invention relates to the construction of the mill housing, saddle and associated parts so that the mill rolls can be removed from the saddle expeditiously and with a great reduction in labor and in down time of the machine as compared to prior practice. As appears in detail below, this is accomplished by providing means for securing all four rolls together in an assembly that can be handled as a unit, and replacement of the assembly by means of a roll changing conveyor, indicated in general at 40, disposed at one side of the mill housing.

Inasmuch as the rolling forces exerted on the work are taken by the mill housing 10, the housing is a massive structure made up of longitudinally extending vertical side plates 42 which are apertured as at 43 to give access to the saddle 11 which reciprocates between the side plates. The side plates are appropriately secured to and supported by horizontal base plates 44 which in turn are mounted on and secured to a massive, arched and webbed base member 45 shown in part in FIGURES 3 and 5 and which is provided with a flange 46 and a similar flange on the opposite side (not shown) so that the base may be appropriately supported in a foundation structure. The base supports the weight of the reciprocating saddle through the tracks 14 which are mounted on the horizontal base plates 44. The base also supports a lower wedge slide 48 on which the wedges 25 reciprocate.

Figure 5:
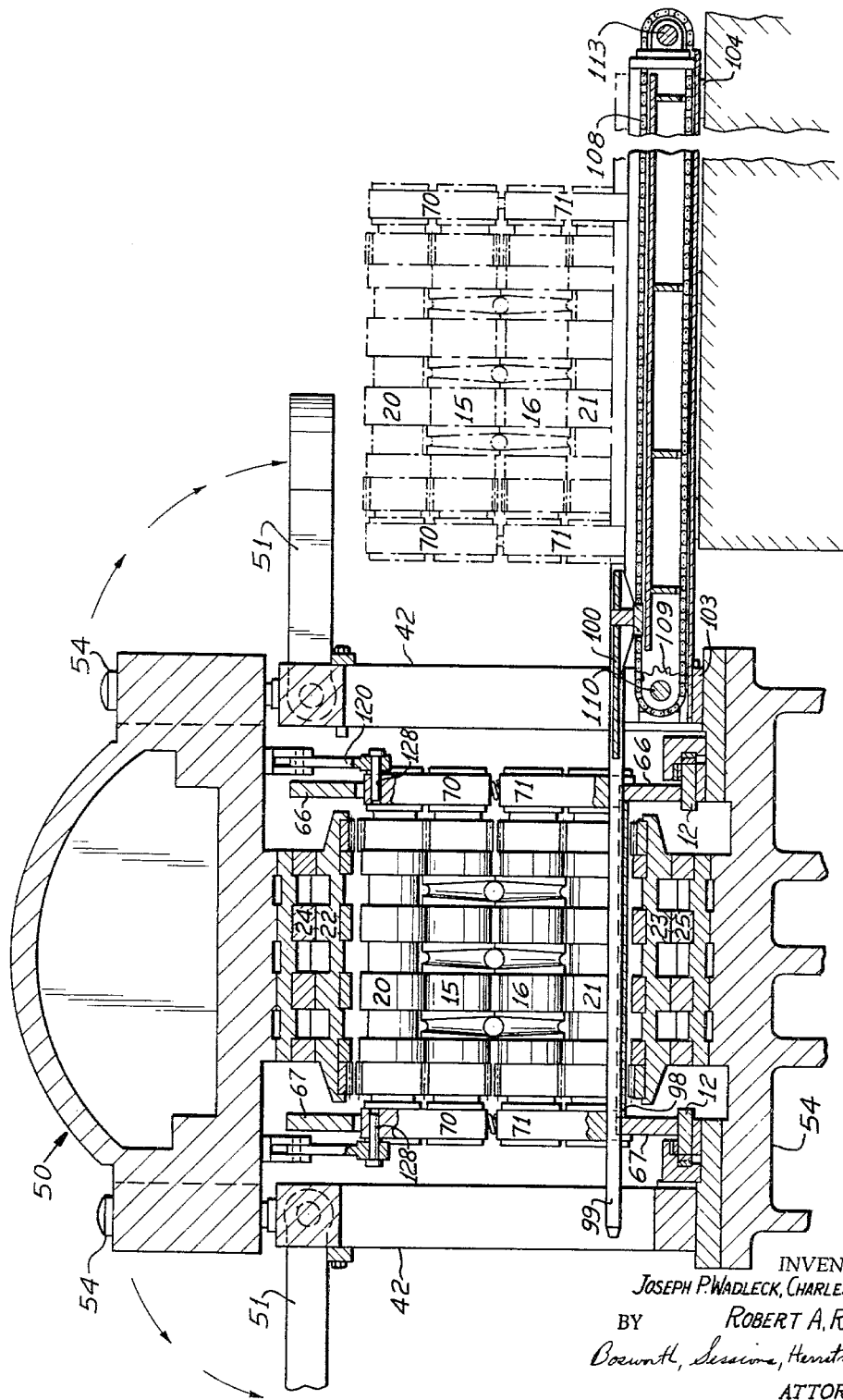
FIGURE 5 is a transverse sectional view through the saddle and mill rolls, showing the conveyor on which the assembly of mill rolls is removed, the conveyor being in position ready to receive the mill rolls.

The top of the mill housing is completed by a cap 50 that is preferably arched and webbed as shown to take the rolling forces. The cap 50 rests on the upper edges of the side plates 42 and is held down against the rolling forces by four locking arms 51 that are disposed at the four corners of the housing. Locking arms 51 are pivoted to the plates 42 as shown at 52. In order to secure the cap firmly on the side plates 42 the locking arms 51 each have a T-shaped head portion 53 which overlies the pistons 54 of hydraulic cylinders 55 that are supported in the cap. When hydraulic fluid under pressure is supplied to the cylinders 55, eight of which are employed in the form of the invention illustrated, the cap is clamped firmly down onto the side plates 42 and the locking arms 51 are placed in tension. When the cylinders are relieved of their hydraulic pressure, the locking arms 51 may be swung about their pivots 52 to release the cap from the side plates, as shown in FIGURE 5. Fluid under pressure may be supplied to and released from the cylinders 55 through conduits 56, which lead to any convenient source of fluid under pressure and appropriate controls (not shown).

In order to provide for lifting the cap 50 from the side plates 43, hydraulic cylinders 57 are set into each side plate adjacent the clamping arms 51. These are connected by conduits 58 to appropriate controls and the source of fluid under pressure. When the locking arms are released and hydraulic pressure is supplied to the cylinders 57 the pistons 59 in the cylinders, one of which is illustrated in FIGURE 3, engage the underside of the supporting flange 60 of the cap to lift the cap from the tops of the side plates 42. This movement is utilized in changing the rolls as appears below. The cap 50, like the base 54, takes the working pressures of the die rolls, the pressures being transmitted from the back-up roll 20 through the thrust plate 22, the wedge 24 and the wedge slide 61 which bears against and is secured to the underside of the cap. The thrust plate and wedges are resiliently supported against the cap by rods 62 which are urged upwardly by springs 63 acting between washers 64 secured to the upper ends of the rod and supporting bosses 65 on the cap. The rods 62 extend through appropriate apertures in the cap, wedge slide and thrust plate and through elongated openings in the wedge member 24. The springs move the thrust plate upwardly when the wedges are withdrawn and permit the thrust plate to be moved downwardly when the wedges are re-inserted. The springs also support the thrust plate and wedge member when the rolls are removed from the apparatus.

*Saddle.*—The saddle is illustrated in FIGURES 3 to 9 and comprises two longitudinally extending side plates 66 and 67. Plates 66 and 67 are apertured as at 68 and 69 in order to receive the bearing blocks that support the working rolls 15 and 16 and the back-up rolls 20 and 21. Working roll 15 is supported in a pair of U-shaped bearing blocks 70 disposed at either end of the roll and the lower working roll 16 is supported in a similar pair of inverted U-shaped bearing blocks 71 disposed at either end of the roll. Bearing blocks 70 and 71 are slidably mounted within the recesses 68 and 69 of the side plates 66 and 67, the blocks sliding in guides 72 in side plates 66 and guides 73 in side plate 67. Guides 72 are provided with removable bearing retaining plates 74, and the parts are so dimensioned that upon removal of these retaining plates both pairs of bearing blocks can be removed from the saddle, carrying with them the rolls. The back-up rolls 20 and 21 are supported in bearing blocks 75 and 76 that are slidably mounted in the openings of the U-shaped bearing blocks 70 and 71, respectively.

Since the bearing blocks are slidable in the side plates 66 and 67, the working rolls 15 and 16 are held together when the wedges 24 and 25 are in their inner positions and when the wedges are withdrawn the rolls can move apart. When the wedges are withdrawn, the lower working roll 16 is maintained in engagement with lower back-up roll 21 and back-up roll 21 in engagement with the thrust plate 23 by the force of gravity. Also, thrust plate 23 is held in engagement with the wedge member 25 and the wedge is held in engagement with the slide 48 by the force of gravity. Similarly, when the wedge member 24 is withdrawn the upper rolls 15 and 20, thrust plate 22 and wedge member 24 are all held upwardly with the wedge member against slide 61 by compression springs 78 disposed in recesses 79 in the bearing blocks 70 and 71. There are two springs 78 on each side of the saddle. As shown in FIGURES 6, 7, 8, and 9, the upper ends of the springs 78 act upwardly against the bottoms 80 of the recesses 79 in the bearing blocks 70. The lower ends of the springs are supported by collars 81 and are slidable on the rods 82 that extend through the centers of the springs and are guided in the lower and upper bearing blocks. In working position, as shown in FIGURES 8 and 9, collars 81 are urged upwardly to compress the springs 78 by cooperating wedges 83 that extend through slots in the collar. The enlarged lower ends 84 of the rods 82 bear on the lower portions 83 of the side members 66 and 67, thus transmitting the thrust of the spring and the load imposed by the weight of the rolls 15 and 20 to the side flanges. The springs hold the rolls 15 and 20 upwardly in proper position, separating the working rolls, when the wedges are withdrawn, and allow the rolls to be moved downwardly to working position when the wedges are replaced. The rods 82 also function to secure the rolls together in a unitary assembly during removal and replacement of the rolls, as described below.

In order to insure proper rotation of the rolls during reciprocation of the carriage, the upper thrust plate 22 carries racks 87 that engage pinions 88 on the upper back-up roll 20. These pinions in turn engage pinions 89 on the upper working roll 15. A similar arrangement consisting of racks 90 and pinions 91 and 92 is employed for driving the lower rolls 16 and 21.

Figure 4:
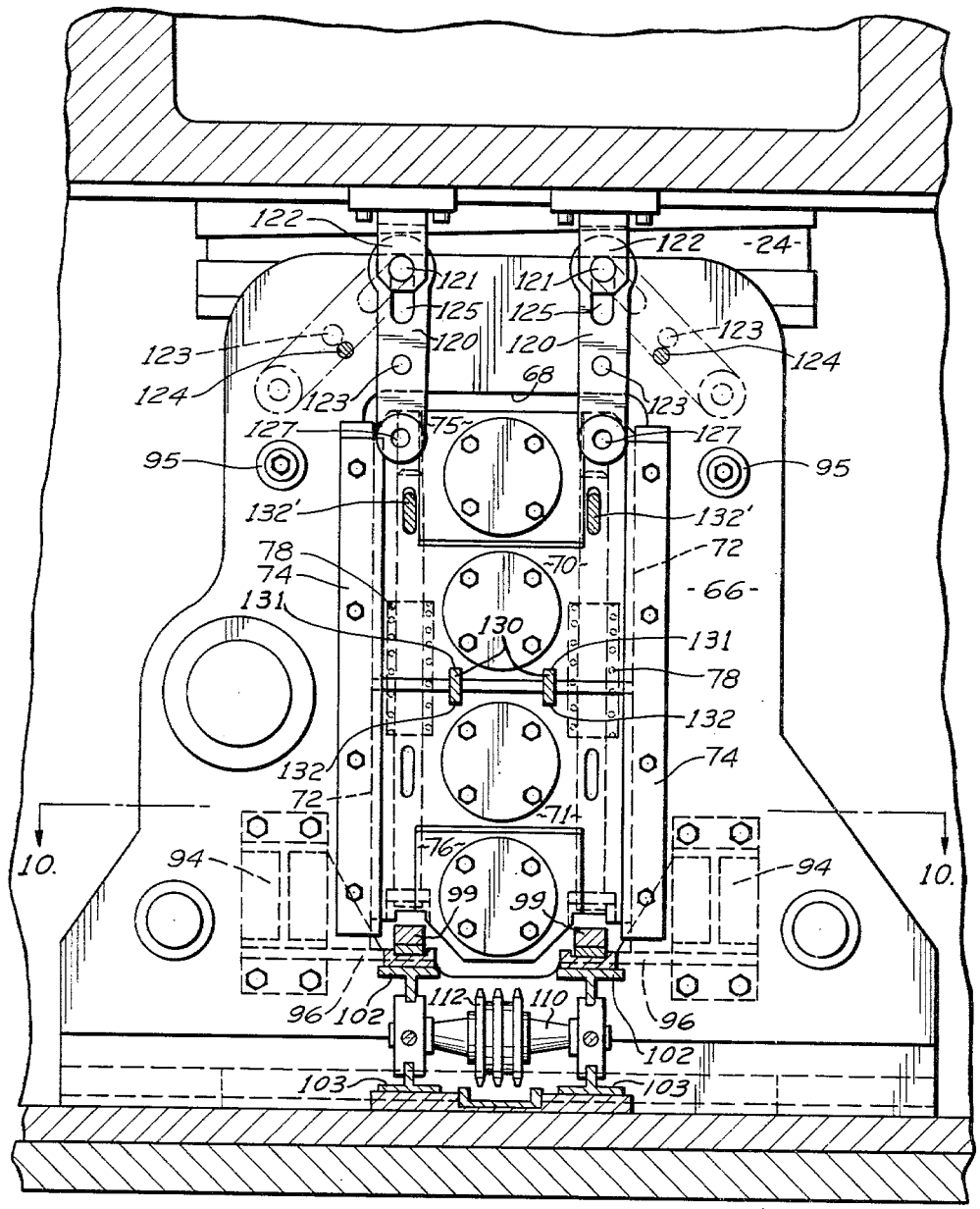
FIGURE 4 is a longitudinal sectional view taken along line 4—4 of FIGURE 3, but showing the mill rolls in a raised position that they occupy during the operation of removing them from the machine.
Figure 10:
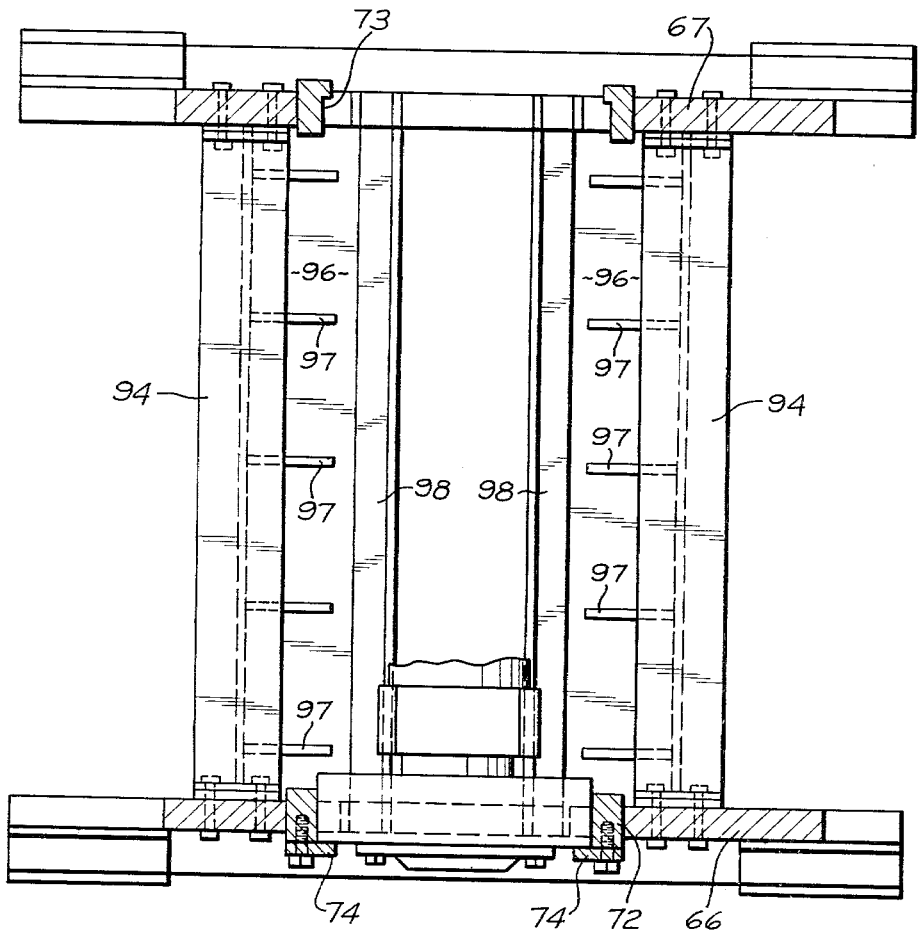
FIGURE 10 is a section view taken on line 6—6 of FIGURE 4 but with the roll-supporting rails of the roll changing conveyor removed from beneath the rolls.

The side plates 66 and 67 are held together in a rigid structure by lower transverse beams 94 and upper tie rods 95 (see FIGURE 4). As shown in FIGURE 10 the beams 94 support transverse supporting plates 96 by means of gusset plates 97. Transverse plates 96 carry tracks 98 which function to support the forks or rails 99 of the roll changing conveyor as will hereinafter appear.

*Roll changing conveyor.*—The roll changing operation is carried out by securing the rolls together in a unitary assembly, releasing the assembly from the saddle and then moving the assembly transversely to remove it from the apparatus. The roll changing conveyor functions to transport the assembly between working position and a position beside the mill housing 10 and is disposed at one side of the mill housing. The rails 99 of the conveyor, as shown in FIGURES 4 and 5, are adapted to be inserted beneath the roll assembly 21. The assembly is then lowered onto the rails 99 and the conveyor 40 is operated to remove the entire roll assembly from the saddle and place it in a position at one side of the machine as indicated in broken lines in FIGURE 5. In this position the assembly of rolls can, if desired, be removed by a crane and another roll assembly deposited on the rails 99 for replacement in the machine.

The roll changing conveyor may take any convenient form, a preferred and simple construction being illustrated in FIGURES 5, 11, 12, 13 and 14. As there shown, rails 99 are connected together by a plate 101 at the ends of the rails that are remote from the machine as a whole and the rails project forwardly from the plate 101 to provide a bifurcated fork member for removing the roll assembly from the machine.

In order to support the rails 99 and to move them toward and away from the machine, the conveyor embodies a base made up of a pair of I-beams 102 carried by supporting plates 103 at the end of the carriage near the machine and supporting plates 104 at the end of the carriage remote from the machine. Plates 103 are supported by one of plates 44 of the mill housing 10 (see FIGURES 3 and 5) while plates 104 are supported by the foundation structure. The upper surfaces of the I-beams are provided with slides 105 having anti-friction inserts 106 on which the rails 99 are slidably supported. In order to move the fork member made up of the rails 99, the plate 101 is provided with a depending bracket 107 near the end thereof remote from the mill housing and one or more chains 108 are secured to the bracket. At the end of the carriage base near the mill housing, the chains 108 pass over idler sprockets 109 carried by an axle 110 supported by suitable bearings 111 that are mounted in the webs of the I-beams 102 (see FIGURE 13). At the outer ends of the base the chains pass over driving sprockets 112 that are carried by a driven axle 113 which is supported by suitable bearings in projecting brackets 114, the axle being driven by any convenient means such as the motor 115 and reduction gearing 116 (see FIGURE 1a).

A U-shaped upper chain guide 117 extends between the upper flanges of the I-beams 102 as shown in FIGURES 11, 12 and 14. Thus the guide is also supported by webs 118 extending between the beams 102 and which function to strengthen the whole structure. A channel-section lower chain guide 119 is also provided. This is supported at its ends by the base plates 103 and 104. Thus, the conveyor base provides a simple and rigid structure on which the fork made up of the rails 99 and the plate 101 is slidably supported and by means of which the fork can be moved into position beneath the roll assembly and removed therefrom to positions where the rolls may be removed from the fork by a crane or the like.

*Operation.*—The operation of the machine as a whole is similar to the operation of the machine described in the said Krause patent; therefore, only the roll changing operation is described herein. When it is desired to remove or change the die rolls, the machine is stopped with the saddle 11 positioned in alignment with the roll changing conveyor 40 and with the wedges in their inward or working position; i.e., the saddle is stopped during the working stroke in a position in alignment with roll changing carriage. The keys or wedges 83 are then removed, releasing the collars 81 from rods 82 and removing the support from springs 78 that normally urge the rolls 15 and 20 upwardly. Next, four lifting bars 120, which are supported by pins 121 carried by brackets 122 depending from the bottom of the cap 50 are swung downwardly from their idle or storage positions shown in FIGURE 3 and in broken lines in FIGURE 4 to the lifting positions shown in full lines in FIGURE 4 and in FIGURE 5. The lifting bars are retained in inactive position by engagement of pins 123 that are carried by the bars with projections 124 on the mill housing side plates 42 and 43. The bars are slotted as at 125 to receive pins 121, so that the pins 123 can be readily disengaged from the projections 124 and so that the apertures 127 in the ends of the bars can be aligned with openings 128 in the upper bearing blocks 70. Lifting pins are then inserted through the apertures 127 and into the openings 128.

Next the hydraulic pressure in the cylinders 55 is released and the locking arms 51 are swung out of engagement with the cap 50 to the horizontal positions shown in FIGURE 5, releasing the cap from the side plates 42 and 43. After the cap has been released, hydraulic pressure is admitted to the lifting cylinders 57 and the cap is raised by the pistons 59, carrying with it the upper bearing chocks to which the lifting bars have been secured. The cap is lifted only enough to permit aligning wedges or keys 130 to be put in place in the aligned slots 131 and 132 in the bearing blocks 70 and 71, respectively. As shown, there are two keys on each side of the assembly. These keys keep the bearing blocks and rolls in proper alignment when the bearing blocks are removed from the saddle.

Figure 6:
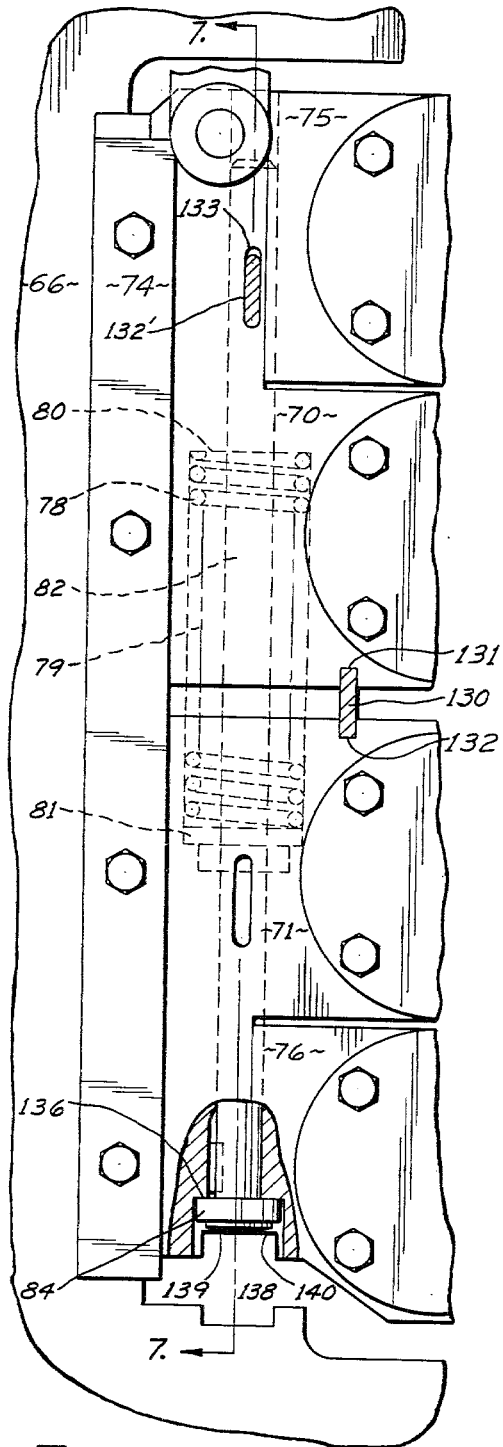
FIGURE 6 is a fragmentary side elevational view with parts broken away, showing a portion of the mill roll assembly on an enlarged scale and illustrating the parts in the position they take when the roll assembly is locked together for removal from the apparatus.
Figure 7:
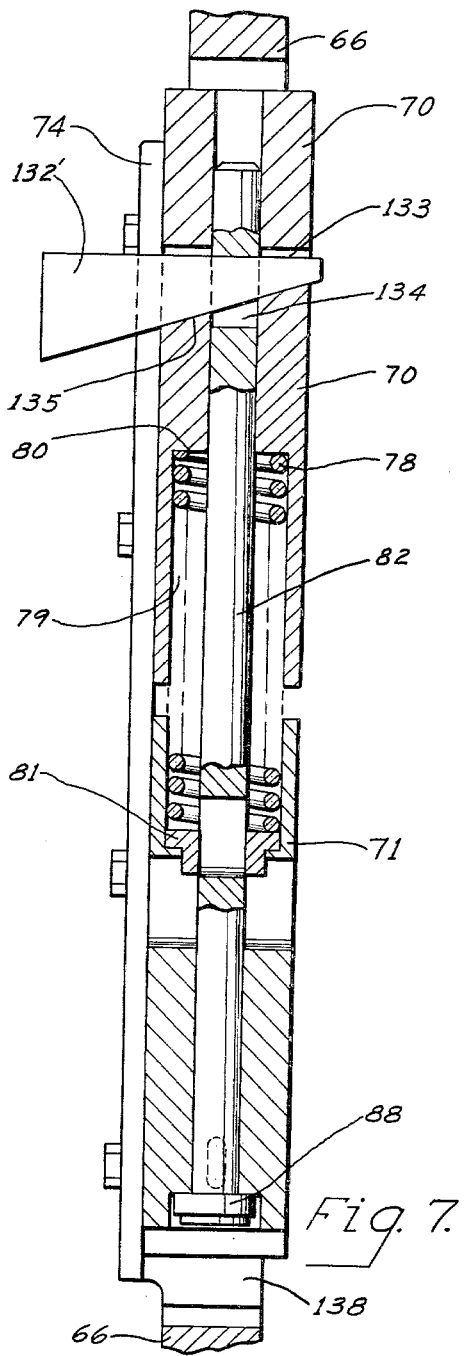
FIG. 7 is a section view taken on line 7—7 of FIGURE 6.

In order to hold the bearing blocks in a solid assembly so that they can be handled as a unit wedges 132 shown in place in FIGURES 4, 6 and 7 are driven into slots 133 in the bearing blocks 70 and aligned slots 134 in the rods 82. It is to be noted that the recesses 136 are partially formed within the bearing blocks 76 that support the lower back-up roll 21 so that the heads 84 of the rods 82 support these bearing blocks within the U-shaped bearing blocks 71 (see FIGURES 6 and 7). The bearing blocks 75 that support the upper back-up roll 20 are held within the U-shaped bearing block 70 by the force of gravity.

After these operations have been completed, the cap is lifted by again admitting fluid under pressure to the cylinders 56. The cap is lifted sufficiently to provide clearance space as shown at 138 in FIGURE 6 to receive the rails 99 of the roll changing conveyor. The rails are then run into position beneath the roll assembly by operation of the motor 115. Next, the cap is lowered by relieving the hydraulic pressure in the cylinders 56. The bearing blocks 71 and 76 then rest on the rails 99 as shown in FIGURE 5. The lower surfaces 139 and 140 of bearing blocks 71 and 76, respectively, are formed to both engage the rails 99. In this position, the rails 99 are supported against the weight of the roll assembly by the tracks 98 that are carried by the saddle (see FIGURES 5 and 10). It is to be noted that when the bearing blocks are resting on the rails 99, the roll 21 and the bearing blocks are elevated sufficiently to clear the walls of the opening 68 in the side plate 66. Also, the pinions 91 have been disengaged from the racks 90 and elevated sufficiently to clear the tracks on the thrust plate 23.

With the roll assembly in the position just described, the lifting pins 127 are withdrawn and the lifting bars 120 are swung to the idle position shown in broken lines in FIGURE 4. Then, if necessary, the cap is again raised by the cylinder 57 so that the racks 87 and the tracks on the thrust plate 22 will clear the pinions 88 and the upper back-up roll 20.

The operation of removing the rolls is completed by operating the motor 115 to cause the fork to be withdrawn from the saddle carying with it the complete roll assembly. It will be noted that the rails 99 of the fork are supported first by the tracks 98 of the saddle and then by the aligned slides 105 of the base of the conveyor, tracks 105 extending into close proximity to tracks 98 so that the rails 99 are subjected largely to loads in compression.

After the roll assembly has been withdrawn from the saddle, it may be removed from the rails 99 by a crane or other means and taken elsewhere in the shop for reconditioning or repair. Another roll assembly, if desired, may be placed on the rails and replaced in the machine. This new assembly will be locked together by its wedges 132 and the upper and lower sets of rolls held in alignment by its aligning keys 130. The die rolls and back-up rolls of the new assembly are rotated so that the teeth of the pinions of the back-up rolls are in proper alignment with the teeth of the racks 87 and 90. Then the roll changing conveyor, carrying the die roll assembly on the rails 99, is advanced into the machine by operation of the motor 115 until the rolls and the bearing blocks are in proper position. The bearing block retaining plates 74 are replaced to hold the bearing blocks in place. The cap 50 is partially-lowered and the lifting bars 120 are swung downwardly into operative position and attached to the bearing blocks by means of the pins 127. The cap is then raised by means of the hydraulic cylinders 57 sufficiently to lift the die roll assembly clear of the roll changing conveyor. The rails 99 are thereupon withdrawn from the machine by the motor 115 and the cap is lowered until lower back-up roll 21 comes into contact with the lower thrust plate 23 and wedges 132 and keys 130 are removed. Then the cap is lowered onto the side plates and the lifting bars are disconnected from the upper bearing blocks 70 and moved to their inactive positions.

Next, the locking arms 51 are swung back into locking position and pressure is applied to the hydraulic cylinders 55 to secure the cap in place. Finally, the wedges 83 are replaced in the assembly to place the springs 75 under the required degree of compression.

From the foregoing description it will be seen that we have devised a roll changing device for tube rolling mills and other mills for rolling elongated workpieces whereby the rolls of the mill can be removed and replaced with much less labor and much less loss of time than has previously been possible. The roll changing mechanism does not interfere in any way with the normal operation of the machine and can be incorporated in machines of the type described at reasonable cost. It is to be noted that removal and replacement of the mill rolls does not require either the saddle or the mill housing to be disassembled. The massive cap of the mill housing is elevated by means built into the housing itself, thus eliminating the need for the installation of the unusually powerful crane that would be required if it were necessary to remove the cap or otherwise disassemble the mill housing.

Those skilled in the art will appreciate that various changes and modifications can be made in the preferred form of the invention described herein without departing from the spirit and scope of the invention, the essential characteristics of which are defined in the appended claims.

We claim:

1. In a rolling machine having a mill housing, a saddle mounted for reciprocation in said mill housing, a pair of working rolls, a pair of back-up rolls carried by said saddle and means tending to separate said working rolls, said mill housing having thrust plates for engaging said back-up rolls and transmitting the rolling forces exerted on said rolls to said mill housing, said back-up rolls being in rolling engagement with said thrust plates; means providing for the simultaneous removal of all said rolls from the machine comprising bearing blocks mounted in said saddle for supporting said rolls, said bearing blocks and rolls carried thereby being removable from said saddle from one side thereof, said mill housing having an aperture on one side thereof permitting removal of said bearing blocks and rolls therethrough, means for temporarily securing said bearing blocks together whereby the assembly of working rolls, back-up rolls and bearing blocks can be handled as a unit, means for increasing the distance between said thrust plates to provide clearance between said thrust plates and said mill rolls and means for conveying said assembly of rolls and bearing blocks transversely of the saddle through said aperture to a position alongside said machine.

2. In a rolling machine having a mill housing, a saddle mounted for reciprocation in said mill housing and mill rolls carried by said saddle, said mill housing having a cap and having thrust members for backing up said mill rolls and transmitting the rolling forces exerted on said rolls to said mill housing; means providing for the removal of said rolls from the machine comprising bearing blocks for supporting said mill rolls, said bearing blocks and rolls carried thereby being removable from said saddle from one side thereof, said mill housing having an aperture on one side thereof permitting removal of said bearing blocks and rolls therethrough, means for temporarily securing said bearing blocks together whereby the assembly of rolls and bearing blocks can be handled as a unit, means mounted on said mill housing for raising said cap to increase the distance between said thrust members to provide clearance between said thrust members and said mill rolls and means for conveying said assembly of rolls and bearing blocks transversely of the saddle through said aperture to a position alongside of said machine.

3. In a rolling machine having a mill housing, a saddle mounted for reciprocation in said mill housing and mill rolls carried by said saddle, said mill housing having a cap, thrust members for backing up said mill rolls and transmitting the rolling forces exerted on said rolls to said mill housing; and racks associated with said thrust members and pinions driven by said racks for positively driving said rolls as said saddle reciprocates; means providing for the removal of said rolls from the machine comprising bearing blocks for supporting said mill rolls, said bearing blocks and rolls carried thereby being removable from said saddle from one side thereof, said mill housing having an aperture on one side thereof permitting removal of said bearing blocks and rolls therethrough, means for temporarily securing said bearing blocks together whereby the assembly of rolls and bearing blocks can be handled as a unit, means for detachably connecting said cap to said assembly, means for raising said cap to lift said assembly and to increase the distance between said thrust members to provide clearance between said thrust members and said mill rolls and between said racks and the pinions driven thereby, and means for conveying said assembly of rolls and bearing blocks transversely of the saddle through said aperture to a position alongside said machine.

4. In a rolling machine having a mill housing, a saddle mounted for reciprocation in said mill housing and mill rolls carried by said saddle, said mill housing having a cap and having thrust members for backing up said mill rolls and transmitting the rolling forces exerted on said rolls to said mill housing; means providing for the removal of said rolls from the machine comprising bearing blocks for supporting said mill rolls, said bearing blocks and rolls carried thereby being removable from said saddle from one side thereof, said mill housing having an aperture on one side thereof permitting removal of said bearing blocks and rolls therethrough, means for temporarily securing said bearing blocks together whereby the assembly of rolls and bearing blocks can be handled as a unit, means for raising said cap to increase the distance between said thrust members to provide clearance between said thrust members and said mill rolls and a conveyor having a fork member comprising rails insertable beneath said assembly of rolls and bearing blocks for conveying said assembly transversely of the machine through said aperture to a position alongside said machine, said saddle having slides to support said rails and said conveyor having slides aligned with said slides of said saddle for supporting said rails when said fork member is moved transversely of said machine to carry said assembly out of said machine, and power driven means for sliding said fork member on said tracks.

5. In a rolling machine having a mill housing, a saddle mounted in said mill housing and mill rolls carried by said saddle, said mill housing having a base member, side members secured to said base member, a cap secured to the top of said side members and means for transmitting the rolling forces exerted on said rolls to said mill housing; means providing for the removal of said rolls from the machine comprising means for temporarily securing said rolls together whereby the assembly of rolls can be handled as a unit, said assembly being removable from said saddle from one side thereof, said mill housing having an aperture on one side thereof permitting removal of said assembly therethrough, said mill housing cap being releasably secured to said mill housing side members, means acting between said side members and said cap for elevating said cap with respect to said side members and thereby increasing the distance between said cap and said base member to permit transverse movement of said assembly, means for detachably connecting said cap to said assembly of mill rolls whereby said assembly can be elevated by elevating said cap, and a conveyor for conveying said assembly of rolls and bearing blocks transversely of the saddle through said aperture to a position alongside said machine, said conveyor having means for supporting said roll assembly, said supporting means being insertable beneath said roll assembly when said assembly is elevated by said cap.

6. In a rolling machine having a mill housing, a saddle mounted for reciprocation in said mill housing and mill rolls carried by said saddle, said mill housing having side plates, a base secured to said side plates, a cap secured to said side plates and thrust members supported by said base and said cap for backing up said mill rolls and transmitting the rolling forces exerted on said rolls to said mill housing; means providing for the removal of said rolls from the machine comprising bearing blocks for supporting said mill rolls, said bearing blocks and the rolls carried thereby being removable from said saddle from one side thereof, said mill housing having an aperture on one side thereof permitting removal of said bearing blocks and rolls therethrough, means for temporarily securing said bearing blocks together whereby the assembly of rolls and bearing blocks can be handled as a unit, said mill housing cap being releasably secured to said mill housing side plates, means acting between said side plates and said cap for lifting said cap from said side plates and thereby increasing the distance between said thrust members to provide clearance between said thrust members and said mill rolls, and a conveyor for conveying said assembly of rolls and bearing blocks transversely of the machine through said aperture to a position alongside said machine, said conveyor comprising a pair of rail members for supporting said assembly, said saddle having slides to support said rail members and said conveyor having slides aligned with said slides of said saddle for supporting said rails when said rail members are moved transversely of said machine to carry said assembly of rolls and bearing blocks out of said machine, and power means for sliding said rail members on said tracks.

7. In a rolling machine having a mill housing, a saddle mounted for reciprocation in said mill housing and mill rolls carried by said saddle, said mill housing having side plates, a base secured to said side plates and a cap secured to said side plates, thrust members supported by said base and said cap for backing up said mill rolls and transmitting the rolling forces exerted on said rolls to said mill housing, means providing for the removal of said rolls from the machine comprising bearing blocks for supporting said mill rolls, said bearing blocks and the rolls carried thereby being removable from said saddle from one side thereof, said mill housing having an aperture on one side thereof permitting removal of said bearing blocks and rolls therethrough, means for temporarily securing said bearing blocks together whereby the assembly of rolls and bearing blocks can be handled as a unit, said mill housing cap being releasably secured to said mill housing side plates, means acting between said side plates and said cap for elevating said cap from said side plates and thereby increasing the distance between said thrust members to provide clearance between said thrust members and said mill rolls, means for detachably connecting said assembly of rolls and bearing blocks to said cap whereby said assembly can be elevated by elevating said cap, and a conveyor for conveying said assembly of rolls and bearing blocks transversely of the machine through said aperture to a position alongside said machine, said conveyor comprising a pair of rail members for supporting said assembly, said rail members being insertable beneath said assembly when said assembly is elevated by said cap, said saddle having slides to support said rail members and said conveyor having slides aligned with said slides of said saddle for supporting said rail members when said rail members are moved transversely of said machine to carry said assembly of rolls and bearing blocks out of said machine, and means for sliding said rail members on said tracks.

8. In a rolling machine having a mill housing, a saddle mounted for reciprocation in said mill housing, a pair of working rolls, a pair of back-up rolls carried by said saddle and means tending to separate said working rolls, said mill housing having thrust plates for engaging said back-up rolls and transmitting the rolling forces exerted on said rolls to said mill housing, said back-up rolls being in rolling engagement with said thrust plates, means for positively driving said rolls as said saddle reciprocates comprising racks associated with said thrust plates and pinions carried by said back-up rolls and driven by said racks; means providing for the simultaneous removal of all said rolls from the machine comprising bearing blocks mounted in said saddle for supporting said mill rolls, said bearing blocks and rolls carried thereby being removable from said saddle from one side thereof, said mill housing having an aperture on one side thereof permitting removal of said bearing blocks and rolls therethrough, means for temporarily securing said bearing blocks together whereby the assembly of working rolls, back-up rolls and bearing blocks can be handled as a unit, means for increasing the distance between said thrust plates to provide clearance between said thrust plates and said back-up rolls and between said racks and the pinions driven thereby, and means for conveying said assembly of rolls and bearing blocks transversely of the saddle through said aperture to a position alongside said machine.

References Cited by the Examiner

UNITED STATES PATENTS

| | | | |
|---|---|---|---|
| 749,745 | 1/04 | Philp | 80—1.3 |
| 2,037,210 | 4/36 | Buente | 80—1.3 |
| 3,030,835 | 4/62 | Krause | 80—14 |

FOREIGN PATENTS

| | | |
|---|---|---|
| 1,159,355 | 3/60 | France. |
| 1,075,079 | 2/60 | Germany. |
| 1,104,473 | 4/61 | Germany. |

CHARLES W. LANHAM, *Primary Examiner*.